Sept. 12, 1961  G. E. GOLLWITZER  2,999,409
BLANK SEVERING MACHINE
Filed Dec. 19, 1955  8 Sheets-Sheet 1

INVENTOR.
GEORGE ELTON GOLLWITZER
BY Whittemore, Hulbert & Belknap
ATTORNEYS

Sept. 12, 1961 G. E. GOLLWITZER 2,999,409
BLANK SEVERING MACHINE
Filed Dec. 19, 1955 8 Sheets-Sheet 4

INVENTOR.
GEORGE ELTON GOLLWITZER
BY Whittemore, Hulbert,
Belknap
ATTORNEYS Sept. 12, 1961  G. E. GOLLWITZER  2,999,409
BLANK SEVERING MACHINE
Filed Dec. 19, 1955  8 Sheets-Sheet 8

INVENTOR.
GEORGE ELTON GOLLWITZER
BY Whittemore, Hulbert &
Belknap
ATTORNEYS

United States Patent Office 2,999,409
Patented Sept. 12, 1961

2,999,409
BLANK SEVERING MACHINE
George Elton Gollwitzer, McKeesport, Pa., assignor to Kelsey-Hayes Company, a corporation of Delaware
Filed Dec. 19, 1955, Ser. No. 553,869
5 Claims. (Cl. 83—91)

The present invention relates to an improved machine for shearing elongated strip steel blanks such as are subsequently butt-welded in an annular outline and then rolled to form automotive wheel rims of the drop center type. However, it will be apparent as the description proceeds that the improvements of the present machine may be embodied in various sorts of shearing or related cut-off apparatus. This is particularly the case where it is desired to cut blanks of uniform length having truly square cut ends and to stack automatically a desired weight or number of the blanks, for ultimate automatic removal.

It is an object of the present invention to provide a machine of the foregoing character which includes a novel and very simple, reliably operating and wholly accessible mechanism for receiving strip material to be severed, for progressively accumulating a stack of the severed blanks, while maintaining the stack in well squared condition without manual aid, and for then depositing the stack automatically upon a receiver or conveyor by which it is taken away for storage or subsequent fabricating operation.

More specifically, the invention, as it pertains to the blank receiving and stacking mechanism just described, includes a novel, vertically indexable receiving and stacking table. The table slidably receives the forward end of a strip of material which is severed, and upon the severed blank subsequently arriving lengths of blank stock are slid and deposited after severance to form a stack. The top surface of this table is inclined upwardly in the direction in which the material is advanced, which insures that the oncoming forward end of the material will always clear the rear severed end of the preceding blank. Possible vertical bow in the previously stacked blank stock is compensated for, permitting a non-scuffing sliding reception of each incoming length of material onto the stack.

It is a further object of the invention to provide an inclined table type of stacking mechanism as described above, in which the length of material to be blanked is advanced past a reciprocating shear press or unit and into end abutment with an adjustable stop device, the shearing operation taking place coincident with the abutting engagement of the blank length with this device. The table has appropriate control provisions associated therewith to govern the operation of the shear press, as well as a swinging arm type of squaring mechanism. This mechanism includes a roller governed automatically to periodically engage and square up an adjacent side of a stack of the accumulated blanks. The stack may be removed when of the desired size without further truing.

It is another object of the invention to provide apparatus of the above type in which the receiving and stacking table is a downwardly indexing one, periodically lowered so as to afford clearance for the advancing strip material. Specifically, the table is controlled by a hydraulic ram and cylinder and provision is made to automatically pump hydraulic liquid from the hydraulic table supporting column afforded thereby to lower the table a predetermined slight stroke upon each operation of the shear press. The automatic pumping is controlled by means of an improved hydraulic-pneumatic unit actuated periodically as a length of blank material arrives on the receiving table or blank stack thereon.

It is another specific object of the invention to provide an indexing stacking table as described, with which is associated a gravity type conveyor onto which the blank stack is gravitationally deposited as the table indexes downwardly. The stack is thus automatically removed from the zone of stacking operation and the formation of another similar stack resumes immediately.

In still another aspect, it is the object of the invention to provide an improved shear unit for the shear press. In this respect the improvement comprises a pair of shear blades or bars having an improved shear outline. The outline includes shear edges along opposed longitudinal margins of the blade, one of which edges is offset inwardly in relation to the other shear edge, and the blades are arranged with the inwardly offset edge of one blade in shearing relation to the other, outwardly disposed shear edge of the other blade. This arrangement affords a desired shear clearance as the blades are reciprocated.

A still further object is to provide a blade unit of this sort in which each of the shear blades, upper and lower, has a shear outline as described along each of its opposed sides. A pair of similarly contoured blades of this character may be reversed as to their respective coacting shear edges and surfaces, doubling the usage which can be made of each shearing couple or pair before resharping. Moreover, the blades may be interchanged, upper for lower, in reversed orientations of their edges to further multiply the available coupled shear edges.

Generally considered, the invention provides a shearing apparatus which is very open and accessible, particularly at its receiving and stacking mechanism. This enables odd length pieces at the end of the stock supply coil to be removed with a minimum of lost time.

The foregoing as well as other objects will be made more apparent as this description proceeds, especially when considered in connection with the accompanying drawings, wherein:

FIGURES 8 and 9 are, respectively, fragmentary, somewhat schematic views of timing and control instrumentalities associated with the receiving and stacking structure, the outline of other parts of said structure being shown in dot-dash line.

Figure 10:
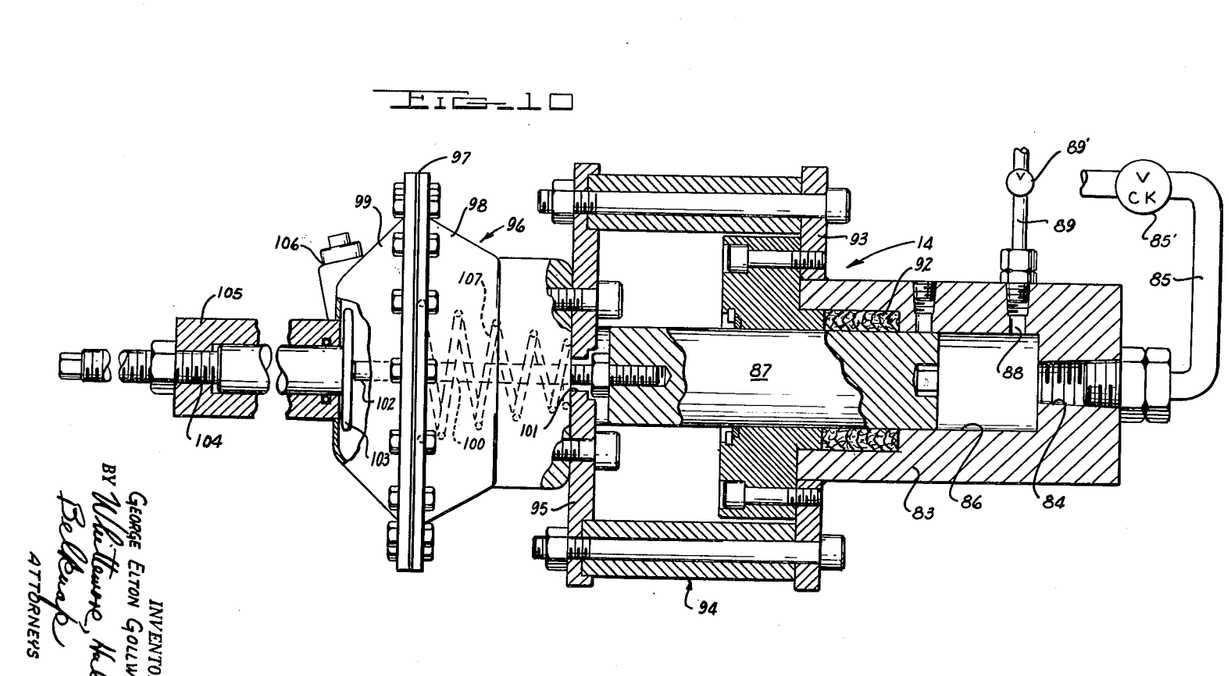
FIGURE 10 is an elevational view, partly in longitudinal axial section, of an improved hydraulic-pneumatic control mechanism of the apparatus.

Generally considered, the apparatus of the invention consists of a vertically acting shear press 10 (see FIGURE 1) by which elongated steel strip material is severed from a length thereof supplied from a coil (not shown); and a blank receiving and stacking unit, generally designated 11. The unit 11 is made up, in the main, of a vertically indexing receiving table 12 onto which the material is slid prior to severance and by which the severed blanks are uniformly stacked, and a roller type gravity conveyor 13 onto which the stack is deposited after the table 12 has indexed downwardly a sufficient number of steps. Downwardly indexing increments of the table movement are effected under the control of a hydraulic-pneumatic escapement mechanism, which is shown in FIGURE 10 and generally designated 14.

The shear press 10 is a more or less conventional type, other than in respect to the present improvement in its shear blade couple or unit 15, by which a strip S of material is severed to provide the progressively accumulating stack of elongated blanks B. See FIGURE 1 of the drawings.

Figure 2:
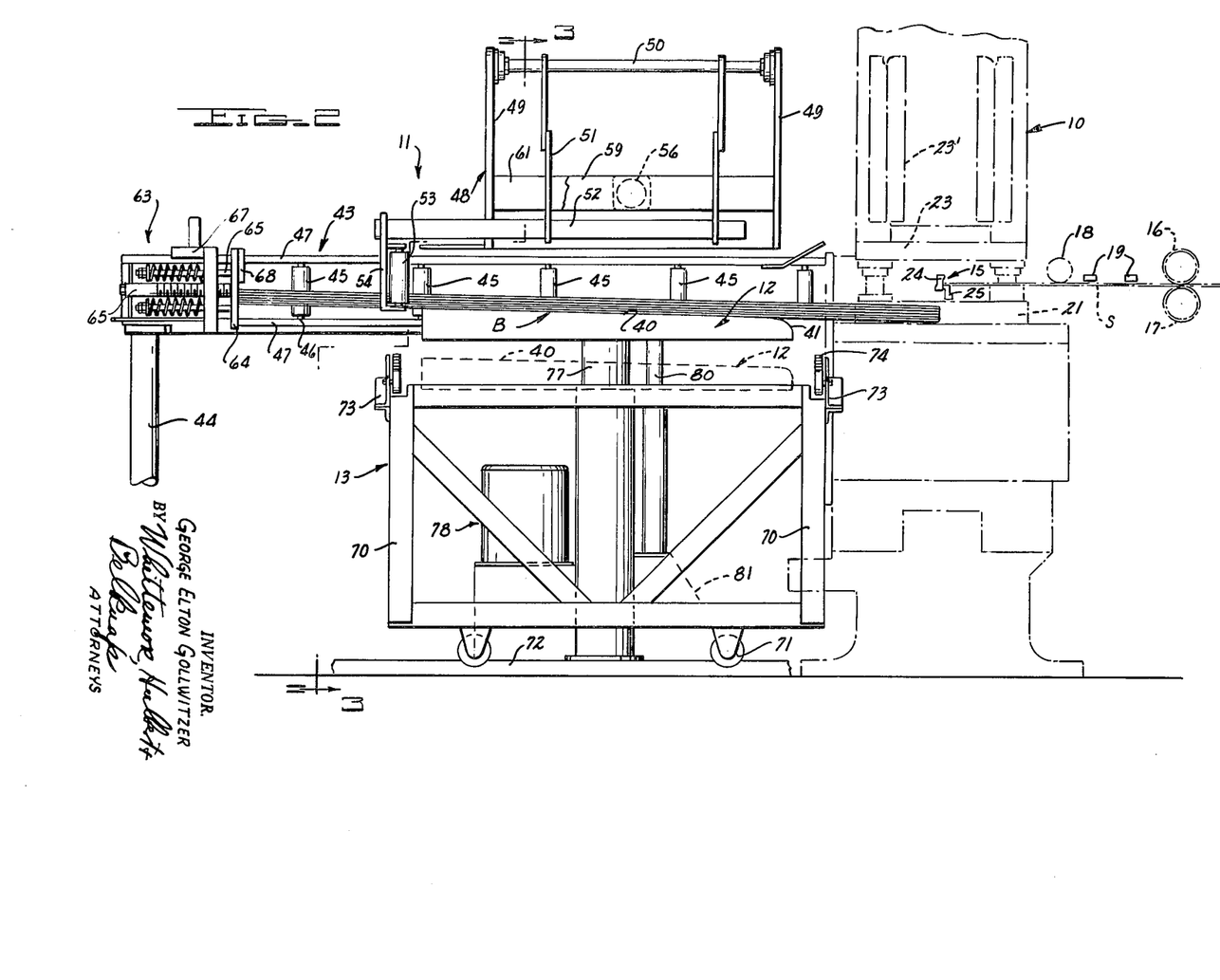
FIGURE 2 is a fragmentary view in side elevation of the machine, its shearing press or unit being largely indicated in dot-dash line, its receiving and stacking table being shown in solid and dotted lines in its upper and lower positions, respectively, and certain of its control instrumentalities being omitted for clarity, as is also the case in FIGURES 3 and 4.

As illustrated in FIGURE 2, the strip S of material to be severed is continuously advanced longitudinally by appropriate feeding and control rollers 16, 17. Provisions such as the top restraining roller 18 and side guide rollers 19 are made to control the strip vertically and horizontally, all of these provisions being quite conventional. They will preferably permit a limited upward buckling or bowing of the strip under an instantaneous resistance to its forward advance, as may periodically occur at the shear blade couple 15.

Figure 6:
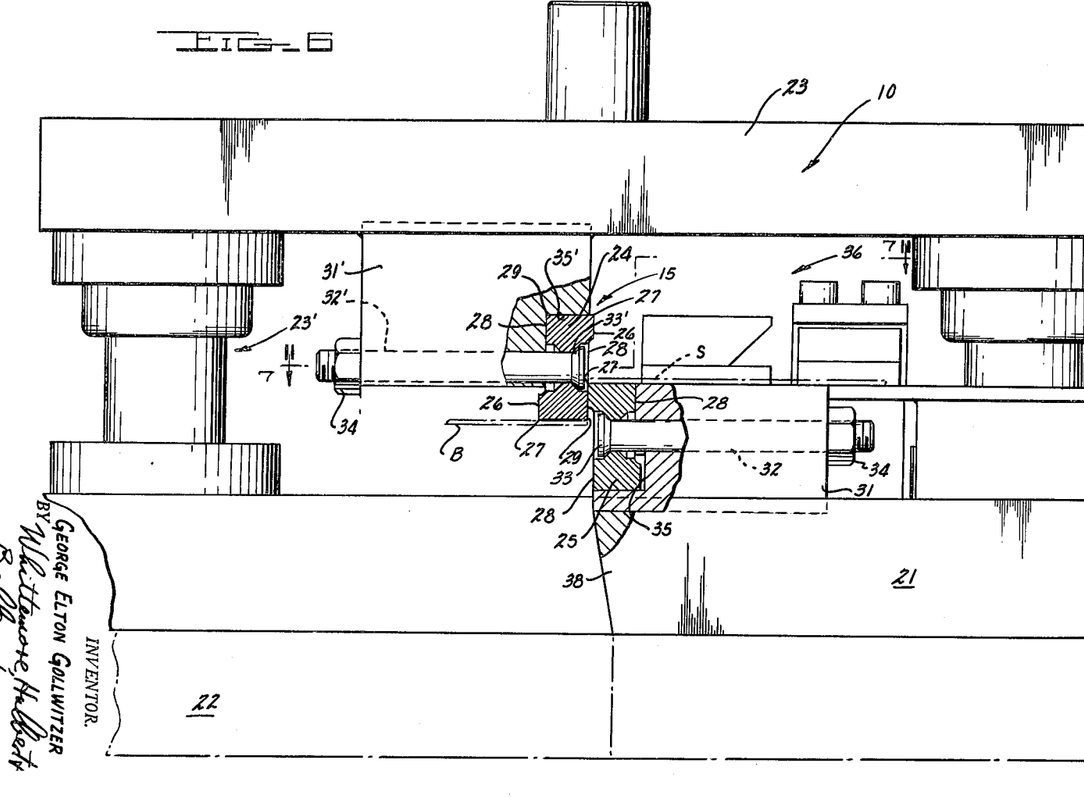
FIGURE 6 is a fragmentary side elevational view, partially broken away and in vertical section, showing in greater detail a portion of the improved shear unit of the invention, which is depicted in dot-dash line in FIGURE 2.
Figure 7:
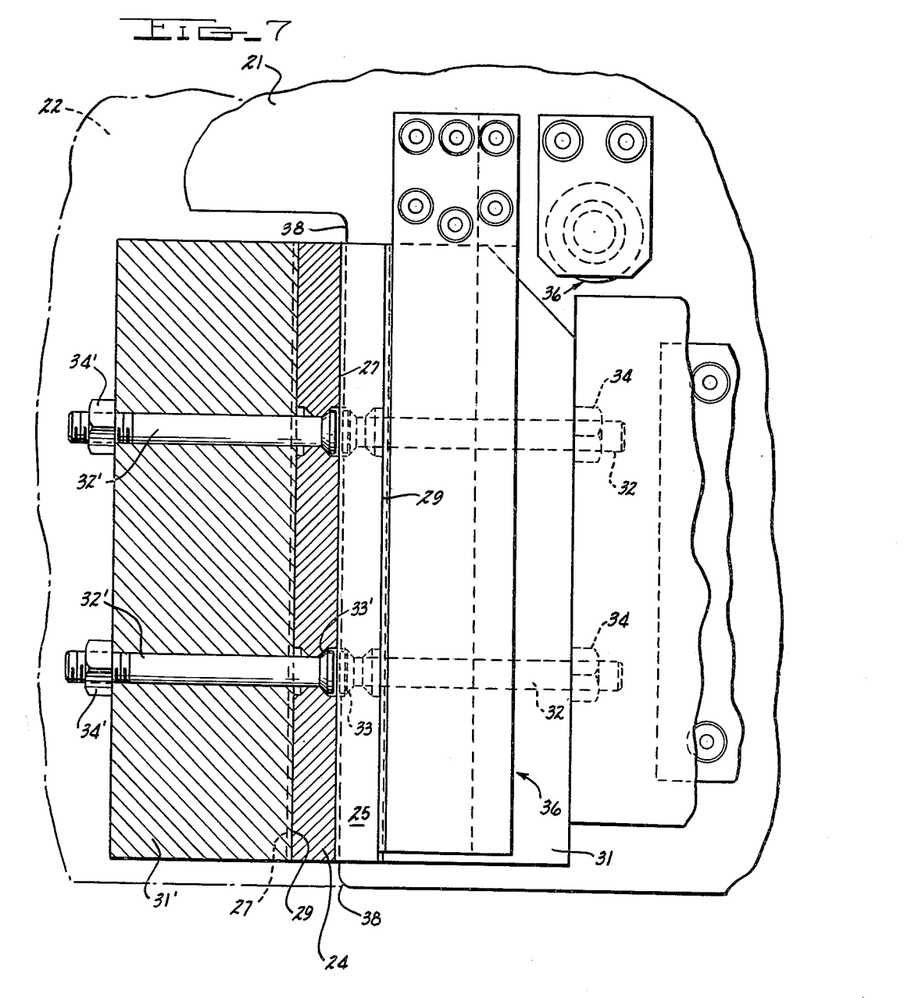
FIGURE 7 is a fragmentary plan view, partially sectioned on line 7—7 of FIG. 6.

The nature of this unit is best illustrated in FIGURES 6 and 7 of the drawings. The shear press 10 includes a lower fixed base block 21 supported on a rigid, massive frame 22, and an upper block 23 which is accurately guided for vertical reciprocation to and from the base 21 by any appropriate provisions. These may be as depicted in dot-dash line in FIGURE 1 and generally designated 21, and their specific nature, as well as the means by which the upper press member is powered for its shearing stroke, constitute no part of the invention. It suffices to say that the operation of the blank receiving and stacking mechanism 11 is timed with that of the shear press 10, so that a blank B severed on each stroke of the latter is in its final longitudinal position on the table 12 when the shear stroke occurs. An increment in the downward indexing of the table 12 takes place just as the blank is severed.

Referring again to FIGURES 6 and 7, the shearing unit 15 comprises a pair of upper and lower elongated and parallel, shear blades 24, 25, respectively, which are of identical cross-sectional contour and length. Each blade is in the form of a bar hardened and ground to provide like parallel, front and rear side surface outlines, as best shown in FIGURE 6. Each such outline includes a vertical cutter land 26 terminating outwardly in a shearing edge 27 along the entire length of the blade; and at the inner extremity of the land 26, the front and rear surfaces are offset inwardly at 28 along the remainder of the vertical blade dimension. The thus recessed surface 28 terminates along the longitudinal margin of the blade in a second shear edge 29 opposite the shear edge 27. It is seen from FIGURE 6 that the respective upper and lower blades 24 are arranged so that the first shear edge 27 of one thereof has shearing coaction with the second edge 29 of the other blade.

The advantage of this arrangement is that the undercut of the rear blade 25 afforded by the recessing of its surface 28 will accommodate inherent spring-back of the blank B after it is sheared. The forward edge of the advancing strip S is, in this instance, in abutment with the corresponding recessed surface 28 of the upper blade 24; however, the strip may buckle somewhat to the rear of this point under the endwise force of its feed provisions.

The identically contoured shear blades 24, 25 may be individually reversed after a period of operation and reused in reversed position before being removed for resharpening. Moreover, the blades may be interchanged, upper for lower and front for rear in their reversible individual positions to multiply the use thereof to be had before re-sharpening. Those skilled in the art will recognize the number of shear edge combinations which are possible.

Readily accessible provisions are made to removably mount the blades 24, 25 of the shearing couple 15. Thus, the base block 21 carries a rigid upper extension block 31, through which a pair of elongated studs 32 extend, and each stud has a tapered or conical outer head 33 received in a correspondingly shaped mating formation of a through hole in the blade 25. The studs 32 clamp the recessed surface 28 of the blade against a forward vertical surface of the block extension 31 when a nut 34 threaded on the outer extremity of stud 32 is tightened. It may be noted that the extension 31 of lower block 21 has a rectangular rabbet 35 along its transversely extending dimension to accommodate the upper blade 24 and receive vertical thrust.

Similar provisions are made to reversibly mount the upper blade 24 on the moving block 23 of the shear press 10, with its shear edge 29 in precise shearing relation to the other edge 27 of the lower blade 25. It is unnecessary to repeat the description of this arrangement; parts and relationships similar to those described in relation to the mounting of the lower blade 25 are designated by corresponding reference numerals, primed. Appropriate guide means, such as are generally designated by the reference numeral 36, may be made to align and guide the strip S as it passes between the shear blades 24, 25 in the separated condition of the latter.

As illustrated in FIGURE 6, the forward surface 38 of the lower blade supporting base block 21, is rearwardly and downwardly tapered so as to avoid frictional interference with the rear ends of blanks B as they are stacked on the table 12.

Figure 1:
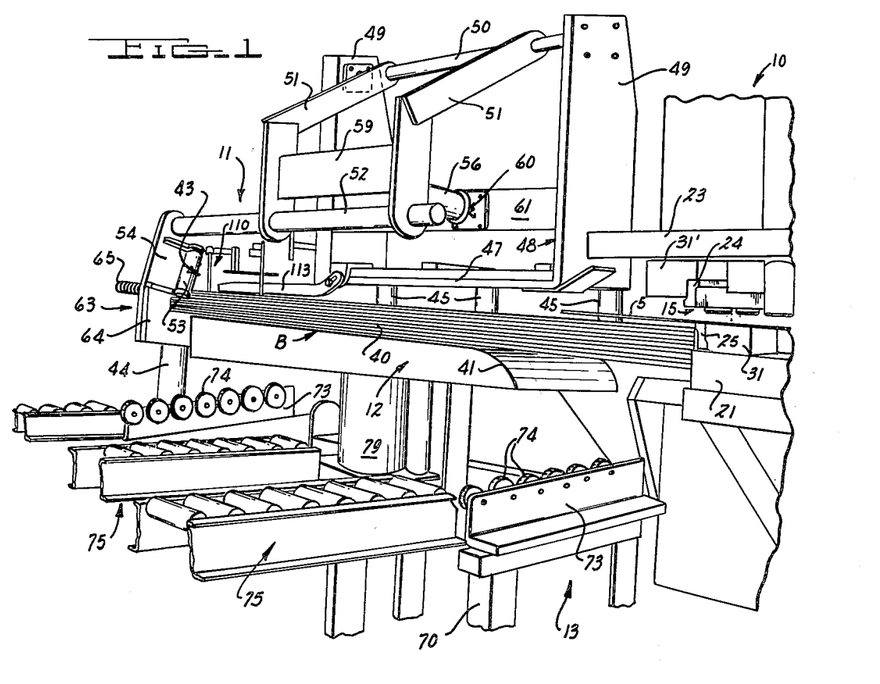
FIGURE 1 is a fragmentary perspective view of a blank severing machine in accordance with the invention.

Referring again to FIGURE 2, the receiving and stacking table 12 of mechanism 11 has an upper elongated surface 40 which is smooth and inclines mildly upwardly in the direction of its length and the direction of advance of the strip S onto the same, i.e. from right to left as viewed in FIGURE 2. Its width is substantially in excess of the width of the blanks B, as shown in FIGURE 1, and it may be provided with a downwardly curved receiving nose 41 facing the shear press 10, if desired. The longitudinal inclination of the table surface 40 is such as to insure proper sliding reception and stacking of the blanks B upon progressive downward indexing of table 12, notwithstanding possible curvature of the strip S and the blanks B severed therefrom. The initial blank length slides smoothly onto and over the table surface 40, and its rear edge will under no circumstance be at an elevation to interfere with the forward advancing end of the strip from which it was severed. Provisions for downwardly indexing the thickness of a blank at each shearing operation will be hereinafter described.

The receiving and stacking mechanism 11 includes a rigid I-beam side frame 43 (FIGURES 3 and 4) extending longitudinally of and to one side of the table 12. This frame is supported in part by the press 10 and in part by an upright tubular leg 44. The flanges 47 of frame 43 journal the top and bottom trunnions 46 of a plurality of anti-friction side registering rollers 45 against which the adjacent side edge of the strip S and blanks B have rolling engagement in passing onto and over the table 12.

Figure 3:
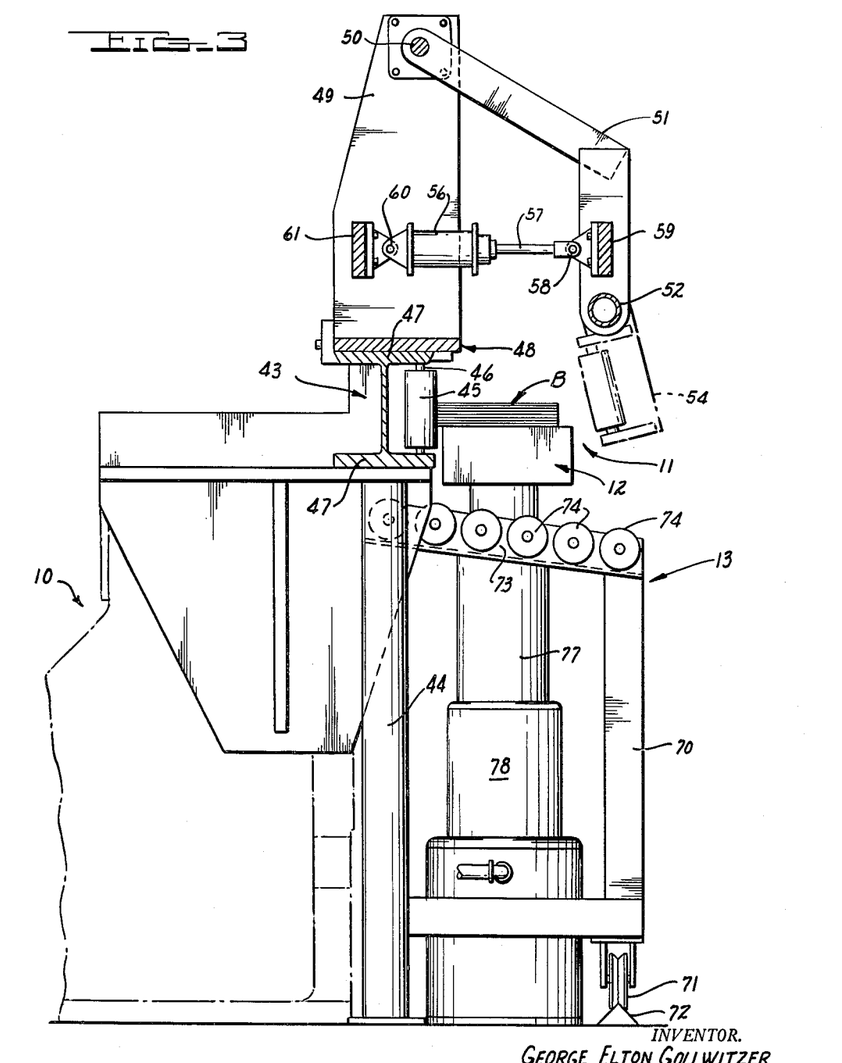
FIGURE 3 is a view in vertical section along a line corresponding to line 3—3 of FIGURE 2.
Figure 4:
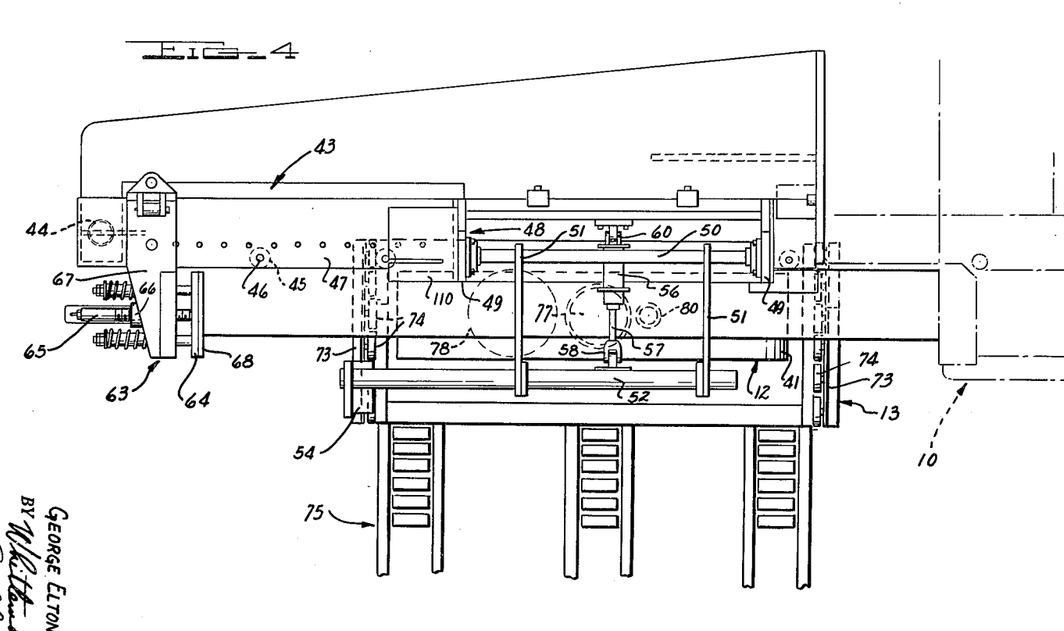
FIGURE 4 is a fragmentary top plan view of the receiving and stacking table structure.

As illustrated in FIGURES 1, 2 and 3, the frame 43 also supports a U-shaped superstructure 48 including braced uprights 49 between which an elongated pivot shaft 50 extends. Swinging arms 51 are pivotally mounted on this shaft in depending relation thereto, and at the lower ends the arms 51 carry an elongated tubular yoke member 52.

A stack squaring idler roller 53 is journaled on a forked support 54 at one end of yoke 52, and the function of the roller 53 is to periodically engage the adjacent edge of the stack of blanks B, i.e., the edge opposite the guide rollers 45, to square up the stack. The swinging arm structure supporting the roller 53 is periodically operated through the agency of a small pneumatic cylinder 56 (FIGURE 3) whose piston has an outwardly projecting plunger stem 57 swiveled at 58 to a rigid cross brace 59 connecting the swinging arms 51 of the mechanism. The cylinder 56 itself is similarly pivoted at 60 to a rigid cross brace 61 of the superstructure 48.

Figure 5:
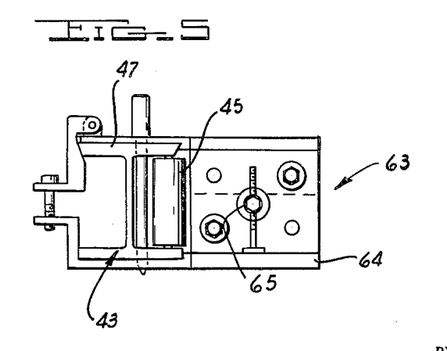
FIGURE 5 is an end view of a portion of the structure, as viewed from the left hand end of FIGURE 2.

The frame 43 also affords a support for an end stop unit, generally designated 63 (see FIGURES 2, 4 and 5), at the forward extremity of the advancing movement of the strip S. Structural details of this stop unit are not of extreme importance in the invention. It may consist of a vertically disposed spring biased plate 64 adjustably mounted by a stud 65 which is adjustably threaded and sustained in a fixed sleeve 66 carried by a lateral bracket 67 extending from the frame 43. The bracket 67 is appropriately clamped to the flanges 47 of this frame. If desired, a hardened replaceable stop plate or shoe 68 may be removably secured on the inner surface of plate 64 to be abutted by the forward end of the strip S as it comes onto the table 12.

The roller conveyor 13 shown in FIGURES 1, 2 and 3, is a skeleton type, in view of the fact that the hydraulic operating provisions for the inclined indexing table 12 are received within the conveyor structure. Conveyor 13 may include a suitable, rigidly braced angle iron frame work 70 equipped with track rollers 71 supporting the same on angle iron tracks 72 paralleling the direction of advance of the strip S. This permits a desired adjustment of the conveyor 13 in the direction of the length of the table 12.

The length of the framework 70 in this longitudinal direction is somewhat in excess of the length of the table 12, as appears in FIGURE 2. It is provided at its ends, outwardly of the table ends, with upstanding brackets 73 which each journal adjacent their tops a series of idler rollers 74, the axes of the rollers inclining in the manner shown in FIGURE 3. A stack of blanks B deposited on these rollers by table 12 will be gravitationally forwarded to further conveyor means such as is generally designated in FIGURE 1 by the reference numeral 75.

The table 12 is pumped upwardly by means of a hydraulic ram or plunger 77 and pump (not shown) driven electrically. The table is indexed downwardly under the control of the improved hydraulic-pneumatic device 14 appearing in FIGURE 10. The hydraulic circuit for the table ram cylinder, including the necessary pump, valving for reversing the direction of ram travel, liquid reservoir or tank, connecting piping and the like, constitutes no part of the invention. It is generally designated in FIGURE 2 by the reference numeral 78. The manner of connecting its parts with one another, as well as with the improved control mechanism 14 of FIGURE 10, will suggest itself to those skilled in the art.

For the purpose of horizontally stabilizing the vertical travel of the table 12, a guide post 80 may be associated with the table, which post is slidably received in an appropriate rigid and fixed base guide, generally designated 81.

Referring now to FIGURE 10 of the drawings, the control mechanism 14 shown therein acts as a hydraulic indexing pump type of escapement to govern the downward indexing movements of table 12 at the completion of each shear at unit 15. A fixed cylinder 83 is provided having an outer axial end passage 84 to which is connected a tube or conduit 85 having a check valve 85' therein and leading to the cylinder in which the hydraulically powered ram 77 moves. The passage 84 opens inwardly to a counterbored cylindrical control chamber 86, in which a control plunger 87 moves axially. The check valve acts to prevent flow of pressure liquid (i.e. a good grade of oil) in conduit 85 from the cylinder 83 to the ram 77. A side discharge port 88 opens through the wall of cylinder 83 adjacent the outer end of chamber 86, and the port 88 is connected by return piping 89 through a suitable relief valve 89' to the reservoir or tank of the hydraulic control unit 78. Relief valve 89' is set at a pressure such that no hydraulic liquid will pass it under the normal ram pressure required to support table 12 and the accumulating pile of blanks.

The unit 14 is a simple pump of positive displacement whose stroke is adjustable by means to be described to determine the extent of downward indexing movement of the table 12 at each blank shearing operation. Upon a stroke of the plunger 87 to the right, as viewed in FIGURE 10, pressure is developed sufficient to force the hydraulic liquid past the relief valve 89' to the ram's reservoir or storage tank. The volume of liquid thus expelled is very definite and determined by the stroke, and, of course, the cross sectional area of plunger 87. A stroke is performed for each blank cut off, and the stroke will be corrected for the blank thickness by the adjustment to be described.

The plunger 87 is appropriately packed at 92 in relation to cylinder 83, and the cylinder is rigidly supported on a forward end plate 93 of a fixed frame 94. A rear plate 95 of this frame carries a spring returned, pneumatic diaphragm type control unit 96, including a flexible diaphragm 97 clamped between hollow housing members 98, 99. A forwardly projecting operating stem 100 is axially carried by the diaphragm 97, and this stem extends through an opening 101 in the plate 95, where it is secured to the adjacent end of the index-timing plunger 87.

The diaphragm 97 has an axial rear stop 102 on its side opposite the stem 100, which stop may have abutting engagement with an adjustable stop disc 103 in the housing member 99 of the pneumatic unit 96. For this purpose the stop disc 103 is threadedly engaged at 104 in a hollow housing extension 105. An axial or endwise adjustment of the disc 103 will determine the pumping stroke of the diaphragm 97 and the plunger 87, thus regulating the indexing stroke of the plunger in accordance with the thickness of the blank B cut off.

Pneumatic pressure is periodically applied to the housing 99 through an appropriate fitting 106 on housing 99 to project plunger 87 to the right, as viewed in FIGURE 10, into closing relation to port 88. This is conveniently accomplished in timed relation to the operation of a pneumatic clutch (not shown) governing the operation of the press 10, so that each operation of the press represents an operation of control unit 14. Upon relief of the pneumatic pressure on diaphragm 97, the parts are returned to the left by a coil return spring 107 in housing member 98, which spring abuts end plate 95 at one end and the diaphragm 97 at its opposite end.

When the pile of blanks B on table D reaches a desired height, a normally closed solenoid valve (not shown) connected in parallel with the control pump unit 14 is opened, allowing the table 12 to drop rapidly and deposit the accumulated stack or bundle of blanks on the roller conveyor 75 (FIG. 1). The advance of the strip S will also be interrupted at this time by suitable provisions as to which the present application is not concerned. Upon gravitational travel of the stack to clear the table 12, the ram 77 is pumped to return the table to its highest position, whereupon advance of the strip S is resumed for another cycle of shearing operation.

Figures 7, 8:
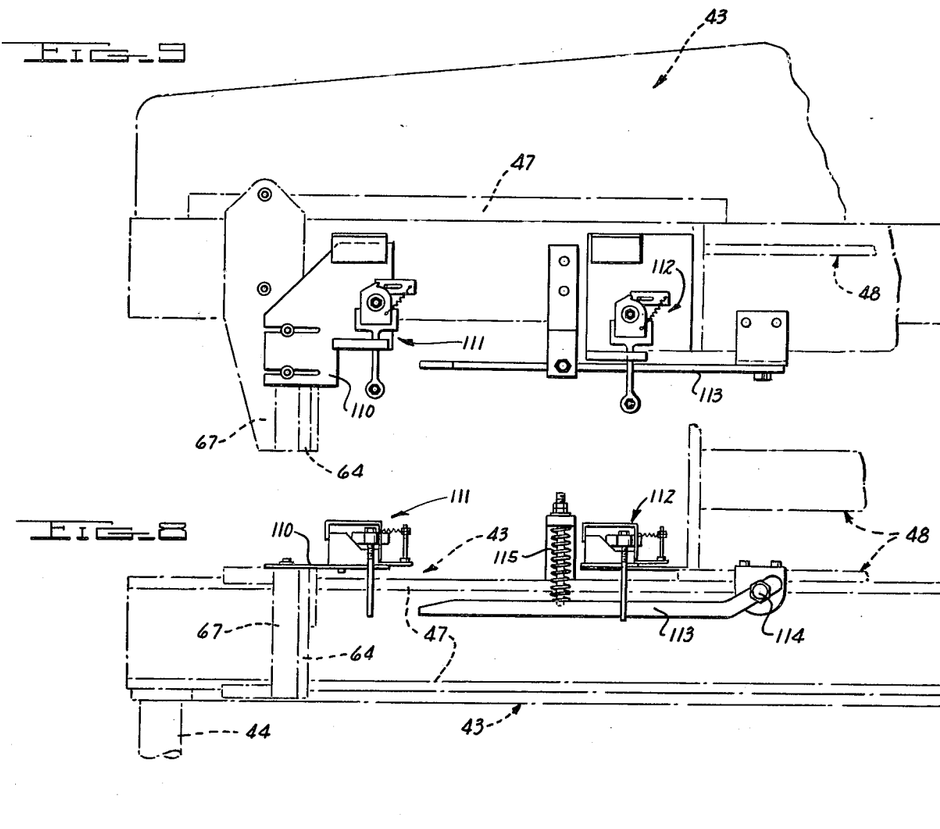

It is deemed neither necessary nor desirable to illustrate and describe in detail the further control provisions of the apparatus since appropriate arrangements will readily suggest themselves to those skilled in the art. However, reference may be made to FIGURES 8 and 9 for a showing of suggested limit switch and related means by which the squaring roller 53 general operation may be timed in relation to the press operation. As there illustrated, a bracket 110 may be adjustably mounted upon the laterally extending end stop bracket 67 carried by the frame 43, the bracket 110 supporting an appropriate limit switch, generally designated 111. This switch will be actuated by each advancing length of the strip S, at such time as its forward end abuts stop plate 64, to control a relay or equivalent means, and thus initiate operation of the shear press 10, as through a clutch or the like. A generally similar limit switch 112 appropriately supported on frame 43 will be correspondingly operated to control the small pneumatic cylinder 56 which actuates the pivotal supporting arm structure for the squaring roller 53. That roller will then swing inwardly and square up the adjacent side of the stack blanks B. A vertically acting rider bar 113, pivoted to frame 43 at 114 and urged downwardly by a spring device 115 on frame 43, may be provided to ride over the top surface of each advancing length of strip material S and thus maintain top control thereon as the strip slides over the inclined table 12, or the topmost blank B of a stack on the table.

The switch provisions described and the tie-in of their operation with the clutch of the press, and with the operation of the pump control unit 14, whose timing is not particularly critical, represent a convenient arrangement for controlling the apparatus described. It will be appreciated that other arrangements are equally practical, and will doubtless occur to those skilled in the art.

It is believed that the operation of the apparatus is clear from the foregoing description. The operation of the shearing blade couple 15 insures a non-snagging relation of its blades 24, 25 to the adjacent end of a blank or stack of blanks severed by the couple. Additionally, the identical cross-sectioning of the elongated blades 24, 25 permits their ready reversibility, each blade in relation to its own mounting member as well as change-over of the blades to different mounting members.

The table 12 is automatically lowered the exactly desired amount by a hydraulic metering and escapement action at the unit 14 of FIGURE 10, the time supply and relief of pneumatic pressure through the fitting 106 being appropriately governed in relation to the operation of shear press 10 by well known means.

The apparatus is one which will efficiently and reliably handle blank stock which may have a substantial curvature, the inclination of table 12 amply compensating for any variations from true planarity of the severed blanks.

It is to be understood that references in this specification, including the claims to follow, to the term "periodically" in the description of the operation of various mechanisms are, unless specifically qualified, to be liberally construed. It will apply to operations which may in some installations be variably intermittent in their occurrence, as well as operations which, as in most installations, will be exactly sequenced in timing. Similarly, all language relating to the positional orientation of mechanisms and operations performed thereby are to be construed in a broad way, unless the positional factor is necessary and/or inherent in the mechanism or its operation.

The drawings and the foregoing specification constitute a description of the improved blank severing machine in such full, clear, concise and exact terms as to enable any person skilled in the art to practice the invention, the scope of which is indicated by the appended claims.

What I claim as my invention is:

1. A stacking mechanism comprising a support to which material to be stacked is intermittently forwarded in a horizontal direction, and an indexing device to periodically lower said support, said device including a hydraulic system providing a hydraulic column through which said support is sustained, a by-pass passage in one-way communication with said column, and periodically operating means to force liquid away from said column and through said passage, said last named means comprising a cylinder in one-way communication with said column, to which cylinder said passage opens, a plunger reciprocable in said cylinder, and a periodically acting, pneumatically controlled unit operatively connected to said plunger to control reciprocation of the latter, said pneumatically controlled unit comprising a flexible spring biased diaphragm mounted in a housing and operatively connected on one side to said plunger, said diaphragm being periodically subjected to pneumatic pressure on its opposite side to actuate said plunger.

2. A stacking mechanism comprising a support to which material to be stacked is intermittently forwarded in a horizontal direction, and an indexing device to periodically lower said support, said device including a hydraulic system providing a hydraulic column through which said support is sustained, a by-pass passage in one-way communication with said column, and periodically operating means to force liquid away from said column and through said passage, said last named means comprising a cylinder in one-way communication with said column, to which cylinder said passage opens, a plunger reciprocable in said cylinder, and a periodically acting, pneumatically controlled unit operatively connected to said plunger to control reciprocation of the latter, said pneumatically controlled unit comprising a flexible spring biased diaphragm mounted in a housing and operatively connected on one side to said plunger, said diaphragm being periodically subjected to pneumatic pressure on its opposite side to actuate said plunger, and an adjustable stop determining the return movement of the diaphragm following such actuation.

3. A stacking mechanism comprising a support for material to be stacked, an indexing device for lowering said support, a hydraulic system providing a hydraulic column through which said support is sustained, an operating mechanism for removing liquid from said column to lower said support, and a fluid controlled unit operatively connected to said operating mechanism for actuating the latter, said unit comprising a movable member operatively connected to said operating mechanism, and means for subjecting said movable member to fluid pressure to actuate said operating mechanism.

4. A stacking mechanism comprising a support for material to be stacked, an indexing device for lowering said support, a hydraulic system providing a hydraulic column through which said support is sustained, an operating mechanism for removing liquid from said column to lower said support, and a fluid controlled unit operatively connected to said operating mechanism for actuating the latter, said unit comprising a spring-biased diaphragm mounted in a housing and operatively connected to said operating mechanism, and means for subjecting opposite sides of said diaphragm to differential fluid pressure to actuate said operating mechanism.

5. In combination, a machine for severing blanks of predetermined length from a continuous strip of material, said machine comprising blank severing means, means for advancing said strip of material past said severing means, a stop spaced beyond said severing means in position to be engaged by the forward edge of said strip of material for accurately determining the length of said strip advanced past said severing means, said stop being at substantially the same height as said severing means, a support for the portion of said strip between said stop and severing means, said support having an elongated straight top surface between said stop and severing means, said top surface being upwardly inclined from end to end in the direction of advance of said strip, means for initially sustaining said support at a level such that the low end of its top surface adjacent said severing means is at a level slightly below said severing means so that said top surface is in position for full surface-to-surface supporting engagement with a substantial length of the mid-section of said portion of said strip between said stop and severing means throughout the full length of said top surface to support said portion of said strip in straight inclined condition before severing and to positively prevent longitudinal bowing of the latter when its forward edge is engaged with said stop, thereby to enable more accurately determining the length of said strip advanced past said severing means, indexing means for periodically lowering said support from the aforesaid initial level thereof to cause the stack of blanks to accumulate thereon with the top blank in the stack in inclined position to support said portion of said strip between said stop and severing means during a severing operation, and means for actuating said severing means.

References Cited in the file of this patent

UNITED STATES PATENTS

| | | |
|---|---|---|
| 688,535 | Makan | Dec. 10, 1901 |
| 810,845 | Cromwell | Jan. 23, 1906 |
| 840,398 | Taylor | Jan. 1, 1907 |
| 923,109 | Biggert | May 25, 1909 |
| 1,131,268 | Prouty | Mar. 9, 1915 |
| 1,150,541 | Ryan | Aug. 17, 1915 |
| 1,292,642 | Pedrick | Jan. 28, 1919 |
| 1,453,458 | Heinrichs | May 1, 1923 |
| 1,481,183 | Browne | Jan. 15, 1924 |
| 1,663,092 | Parys | Mar. 20, 1928 |
| 1,745,958 | Stegmann | Feb. 4, 1930 |
| 1,773,977 | Eriksen | Aug. 26, 1930 |
| 1,942,172 | Johnson | Jan. 2, 1934 |
| 2,145,405 | Schermerhorn | Jan. 31, 1939 |
| 2,205,767 | Lamb | Jan. 25, 1940 |
| 2,308,086 | Landrock | Jan. 12, 1943 |
| 2,393,254 | Leifer | Jan. 22, 1946 |
| 2,406,489 | Case | Aug. 27, 1946 |
| 2,539,602 | Wehr | Jan. 30, 1951 |
| 2,603,291 | Williams | July 15, 1952 |
| 2,636,933 | Lecher | Apr. 28, 1953 |
| 2,637,394 | Fey | May 5, 1953 |
| 2,675,873 | Weirich | Apr. 20, 1954 |
| 2,809,696 | Miller | Oct. 15, 1957 |